United States Patent
Wang et al.

(10) Patent No.: US 7,796,408 B2
(45) Date of Patent: Sep. 14, 2010

(54) HALF-BRIDGE LLC RESONANT CONVERTER WITH SELF-DRIVEN SYNCHRONOUS RECTIFIERS

(75) Inventors: Chih-Liang Wang, Keelung (TW); Ching-Sheng Yu, Wugu Township, Taipei County (TW)

(73) Assignees: GlacialTech, Inc., Taipei County (TW); Chih-Liang Wang, Keelung (TW)

( * ) Notice: Subject to any disclaimer, the term of this patent is extended or adjusted under 35 U.S.C. 154(b) by 0 days.

(21) Appl. No.: 12/346,527

(22) Filed: Dec. 30, 2008

(65) Prior Publication Data

US 2009/0244933 A1 Oct. 1, 2009

(30) Foreign Application Priority Data

Apr. 1, 2008 (TW) .............................. 97111901 A

(51) Int. Cl.
*H02M 7/21* (2006.01)
*H02M 7/217* (2006.01)
*H02M 7/219* (2006.01)
(52) U.S. Cl. ................. 363/21.06; 363/21.02; 363/21.1
(58) Field of Classification Search ................... 363/15, 363/17, 21.02–21.04, 21.06, 21.07, 21.1, 363/21.11, 97, 127
See application file for complete search history.

(56) References Cited

U.S. PATENT DOCUMENTS

| 4,533,986 A * | 8/1985 | Jones ........................... 363/17 |
| 4,992,919 A * | 2/1991 | Lee et al. ....................... 363/17 |
| 7,333,350 B2 * | 2/2008 | Williams et al. ............... 363/17 |
| 2007/0115700 A1* | 5/2007 | Springett ..................... 363/24 |

* cited by examiner

*Primary Examiner*—Gary L Laxton
*Assistant Examiner*—Nusrat J Quddus
(74) *Attorney, Agent, or Firm*—Muncy, Geissler, Olds & Lowe, PLLC

(57) ABSTRACT

The present invention discloses a half-bridge LLC resonant converter with self-driven synchronous rectifiers, which utilizes a primary IC controller and a gate driver to drive the secondary synchronous rectifiers. In correspondence with the gate drive output voltages of the primary IC controller to the primary switch transistors, the gate driver for the secondary synchronous rectifiers comprises a differential transformer if the primary IC controller outputs two ground-referenced gate drive voltages, which cannot directly drive the primary switch transistors but can be imposed on the differential transformer; or comprises a DC shifter, a DC restorer and a differential transformer if the primary IC controller outputs two gate-source voltages, which can directly drive the primary switch transistors but cannot be imposed on the differential transformer. The drive voltages of the primary switch transistors are unipolar; however the drive voltage of the secondary synchronous rectifiers can be bipolar or unipolar. Under the valid operation mode, this converter can decrease the rectifier conduction losses to increase the power converter efficiency.

5 Claims, 14 Drawing Sheets

HALF-BRIDGE LLC RESONANT CONVERTER WITH SELF-DRIVEN SYNCHRONOUS RECTIFIERS

BACKGROUND OF THE INVENTION

1. Field of Invention

The present invention relates to a half-bridge LLC resonant converter with self-driven synchronous rectifiers.

2. Related Art

FIG. 1 shows a circuit diagram of a prior art. An ideal transformer $T_0$ includes a primary winding $N_p$ and two secondary windings $N_s$. A primary circuit is connected to the $N_p$ and a secondary circuit to the two $N_s$.

The primary circuit includes a first switch transistor $M_1$, a second switch transistor $M_2$ and an LLC resonant tank, which includes a magnetizing inductor $L_m$, a resonant inductor $L_r$ and a resonant capacitor $C_r$. $M_1$ and $M_2$ are connected between an input voltage source $V_{in}$ and a primary ground terminal in a half-bridge configuration, where the point at which $M_1$, $M_2$ and the LLC resonant tank intersect is called a first node P, and the LLC resonant tank is connected between the first node P and the primary ground terminal.

It is emphatically noted that a practical transformer $T_1$ is equivalent to the integration of the ideal transformer $T_0$ including the $N_p$ and the two $N_s$, $L_m$ and a leakage inductor, where $L_m$ is in parallel with the $N_p$, and the leakage inductor is in series with the parallel circuit of $L_m$ and $N_p$. $L_m$ can be measured from the primary side with the two $N_s$ open-circuited, and the leakage inductance can be measured from the primary side with the two $N_s$ short-circuited. If the $N_p$ and the two $N_s$ of $T_1$ are wound with a sandwich structure, then an external $L_r$ is necessary, but if the $N_p$ and the two $N_s$ of $T_1$ are wound on a slotted bobbin, then the $L_r$ can be provided by the leakage inductance of $T_1$. A transformer with a slotted bobbin is used in this example.

The secondary circuit includes a first rectifier diode $D_1$, a second rectifier diode $D_2$ and an output capacitor $C_o$. $D_1$ and $D_2$ are connected in a center-tapped common-cathode rectifier configuration between the two $N_s$ and $C_o$, where the two $N_s$ are connected in a center-tapped configuration at the secondary ground terminal, and $D_1$ and $D_2$ are connected in a common-cathode rectifier configuration at the output voltage terminal with an output voltage $V_o$.

For the convenience of illustration, the circuit parameters are defined as follows: $f_s$ is the switching frequency of $M_1$ and $M_2$, $$f_r = \frac{1}{2\pi\sqrt{L_r C_r}}$$

is the resonant frequency of $L_r$ and $C_r$, $$n = \frac{N_p}{N_s}$$

is the primary-to-secondary turns ratio of $T_0$, $V_o$ is the output voltage, and $V_{or}=nV_o$ is the reflected output voltage. Regarding the circuit variables, the reference polarities of the gate-source voltages $v_{GS}^{M1}(t)$ and $v_{GS}^{M2}(t)$ of $M_1$ and $M_2$, the resonant capacitor voltage $v_{C_r}(t)$, the primary voltage $v_p(t)$ and the secondary voltage $v_s(t)$ as well as the reference directions of the resonant inductor current $i_{L_r}(t)$, the magnetizing inductor current $i_{L_m}(t)$, the primary current $i_p(t)$ and the secondary current $i_s(t)$ are also shown in FIG. 1.

According to the conditions of $f_s<f_r$, $f_s=f_r$ and $f_s>f_r$, the waveforms of $v_{GS}^{M1}(t)$, $v_{GS}^{M2}(t)$, $i_{L_r}(t)$, $i_{L_m}(t)$ and $i_s(t)$ are shown in FIGS. 2a, 2b and 2c respectively. As shown in the figures, the waveforms of the first half period and the second half period are symmetrical, so only equivalent circuits and critical waveforms of the first half period are described and those of the second half period can be analogized using the symmetry.

Firstly, the physical meanings of $t=t_0$, $t=t_1$, $t=t_r$ and $t=t_s$ are interpreted as follows: $t=t_0$ is the time when a resonant period resumes, $t=t_1$ is the time when $i_{L_r}(t)$ crosses 0, $t=t_r$ is the time when $i_s(t)$ descends to 0 and $t=t_s$ is the time when $v_{GS}^{M1}(t)$ switches to 0.

Regardless of $f_s \leq f_r$ or $f_s > f_r$, during the interval of $t_0 \leq t \leq t_1$, $v_{GS}^{M1}(t)=0$, $v_{GS}^{M2}(t)=0$, $i_{L_r}(t)<0$ and $i_{L_r}>i_{L_m}(t)$. $M_1$ and $M_2$ are turned off, $i_{L_r}(t)$ flows through the body diode of $M_1$, $i_p(t)=i_{L_r}(t)-i_{L_m}(t)>0$ flows into the dotted terminal of $N_p$, $i_s(t)=ni_p>0$ flows out of the dotted terminal of $N_s$, $D_1$ is turned on and $D_2$ is turned off. $L_m$ does not participate in the resonance of $L_r$ and $C_r$ due to the clamp of $V_{or}$, $i_{L_r}(t)$ and $i_s(t)$ are quasi-sinusoidal waves and the rising slope of $i_{L_m}(t)$ is equal to $$\frac{V_{or}}{L_m}.$$

$D_1$ switches to on state at $t=t_0$ under zero-current-switching (ZCS), and $M_1$ switches to on state during $t_0 \leq t \leq t_1$ under zero-voltage-switching (ZVS) and, more particularly, at $t=t_1$ under ZVS and ZCS, so the switching losses are reduced.

Under the condition of $f_s \leq f_r$ (i.e. $t_r \leq t_s$), $i_s(t)$ descends to 0 before $M_1$ turns off. The interval of $t_1 \leq t \leq t_s$ is divided into two subintervals $t_1 \leq t \leq t_r$ and $t_r \leq t \leq t_s$. During the subinterval of $t_1 \leq t \leq t_r$, $v_{GS}^{M1}(t)=V_{cc}$, $v_{GS}^{M2}(t)=0$, $i_{L_r}(t)>0$ and $i_{L_r}>i_{L_m}(t)$. $M_1$ is turned on, $M_2$ is turned off, $i_{L_r}(t)$ flows through the channel of $M_1$, $i_p(t)>0$ flows into the dotted terminal of $N_p$, $i_s(t)>0$ flows out of the dotted terminal of $N_s$, $D_1$ is turned on and $D_2$ is turned off. $L_m$ does not participate in the resonance of $L_r$ and $C_r$ due to the clamp of $V_{or}$, $i_{L_r}(t)$ and $i_s(t)$ are quasi-sinusoidal waves and the rising slope of $i_{L_m}(t)$ is equal to $$\frac{V_{or}}{L_m}.$$

$D_1$ switches to off state at $t=t_r$ under ZCS. During the subinterval of $t_r \leq t \leq t_s$, $v_{GS}^{M1}(t)=V_{cc}$, $v_{GS}^{M2}(t)=0$, $i_{L_r}(t)>0$ and $i_{L_r}=i_{L_m}(t)$. $M_1$ is turned on, $M_2$ is turned off, $i_{L_r}(t)$ flows through the channel of $M_1$, $i_p(t)=0$, $i_s(t)=0$, both $D_1$ and $D_2$ are turned off. $L_m$ participates the resonance of $L_r$ and $C_r$, and the rising slope of $i_{L_r}(t)$ and $i_{L_m}(t)$ is smaller than $$\frac{V_{or}}{L_m}.$$

Especially, $$\frac{di_{L_m}(t)}{dt} < \frac{V_{or}}{L_m} \Rightarrow v_s(t) = \frac{L_m}{n}\frac{di_{L_m}(t)}{dt} < V_o,$$

$D_1$ is reverse-biased by the voltage difference between $V_o$ and $v_s(t)$ to turn off, and $D_2$ switches to on state at $t=t_s$ under ZCS.

Under the condition of $f_s>f_r$ (i.e. $t_r>t_s$), $i_s(t)$ descends to 0 after $M_1$ turns off. The interval $t_1 \leq t \leq t_r$ is divided into $t_1 \leq t \leq t_s$ and $t_s \leq t \leq t_r$. During $t_1 \leq t \leq t_s$, $v_{GS}^{M1}(t)=V_{cc}$, $v_{GS}^{M2}(t)=0$, $i_{L_r}(t)>0$ and $i_{L_r}(t)>i_{L_m}(t)$. $M_1$ is turned on, $M_2$ is turned off, $i_{L_r}(t)$ flows through the channel of $M_1$, $i_p(t)$ flows into the dotted terminal of $N_p$, $i_s(t)$ flows out of the dotted terminal of $N_s$, $D_1$ is turned on and $D_2$ is turned off. $L_m$ does not participate in the resonance of $L_r$ and $C_r$ due to the clamp of $V_{or}$, $i_{L_r}(t)$ and $i_s(t)$ are quasi-sinusoidal waves and the rising slope of $i_{L_m}(t)$ is equal to $$\frac{V_{or}}{L_m}.$$

During $t_s \leq t \leq t_r$, $v_{GS}^{M1}(t)=0$, $v_{GS}^{M2}(t)=0$, $i_{L_r}(t)>0$ and $i_{L_r}>i_{L_m}(t)$. Both $M_1$ and $M_2$ are turned off, $i_{L_r}(t)$ flows through the body diode of $M_2$, $i_p(t)$ flows into the dotted terminal of $N_p$, $i_s(t)$ flows out of the dotted terminal of $N_s$, $D_1$ is truned on and $D_2$ is turned off. $L_m$ does not participate in the resonance of $L_r$ and $C_r$ due to the clamp of $V_{or}$, $i_{L_r}(t)$ and $i_s(t)$ are quasi-sinusoidal waves and the rising slope of $i_{L_m}(t)$ is equal to $V_{or}/L_m$. Especially, $$\frac{di_{L_m}(t)}{dt} = \frac{V_{or}}{L_m} \Rightarrow v_s(t) = \frac{L_m}{n}\frac{di_{L_m}(t)}{dt} = V_o,$$

$D_1$ remains on. $i_s(t=t_r)$ commutates from $D_1$ to $D_2$ at $t=t_r$ under ZCS.

This conventional converter benefits from lower switching losses due to ZVS and ZCS but suffers from higher conduction losses due to the diode rectifiers. To reduce the conduction losses, self-driven synchronous rectifiers (SRs) are proposed. The primary switch transistors and the secondary SRs are driven by an IC controller and a gate driver simultaneously. Conceptually, the IC controller can be a primary IC controller or a secondary IC controller. Practically, a primary IC controller has three advantages over a secondary IC controller: (1) easier to buy from the market, (2) easier to cooperate with a primary power factor corrector and (3) easier to realize the protection functions of the converter. Based on a primary IC controller, a cost-effective half-bridge LLC resonant converter with self-driven synchronous rectifiers is proposed.

SUMMARY OF THE INVENTION

According to an aspect of the present invention, a half-bridge LLC resonant converter with self-driven synchronous rectifiers uses a primary IC controller and a gate driver to drive the primary switch transistors and the secondary synchronous rectifiers.

In correspondence with the gate drive output voltages of the primary IC controller to the primary switch transistors, the gate driver of the secondary synchronous rectifiers comprises a differential transformer if the primary IC controller outputs two ground-referenced gate drive voltages, which should be followed by a drive module for driving the primary switch transistors; or further comprises a DC shifter and a DC restorer if the primary IC controller outputs two drive voltages referred to the sources of two primary switch transistors and these two voltages can directly drive the primary switch transistors.

The drive voltage of the primary switch transistors is unipolar, and the drive voltage of the secondary synchronous rectifiers can be bipolar or unipolar.

BRIEF DESCRIPTION OF THE DRAWINGS

FIGS. 4b and 4c show a circuit diagram and drive voltage waveforms of the third embodiment according to the present invention.

FIGS. 6b and 6c show a circuit diagram and drive voltage waveforms of the sixth embodiment according to the present invention.

DETAILED DESCRIPTION OF THE INVENTION

Figure 1:
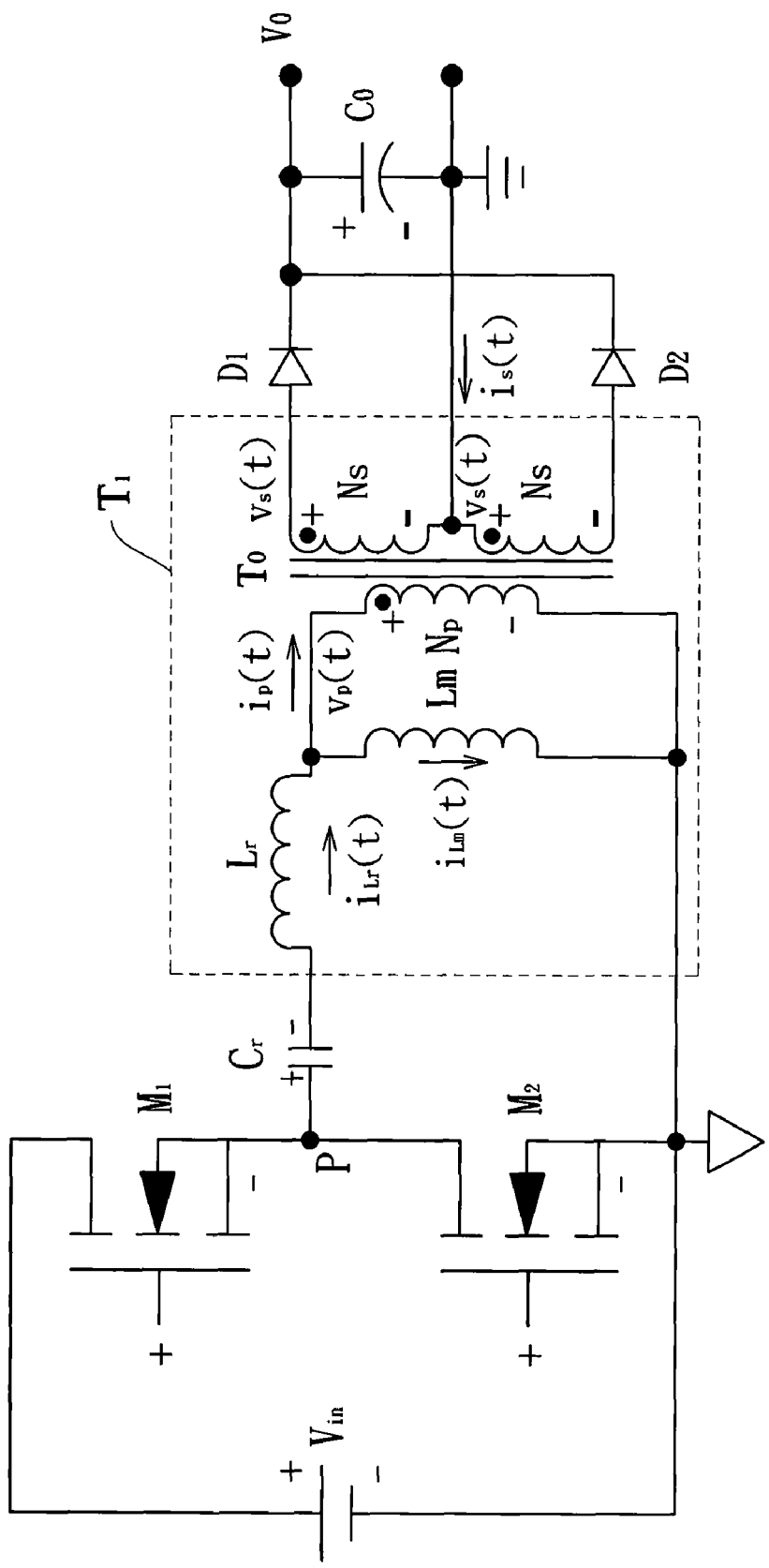
FIG. 1 shows a circuit diagram of a half-bridge LLC resonant converter according to a prior art.
Figure 2A:
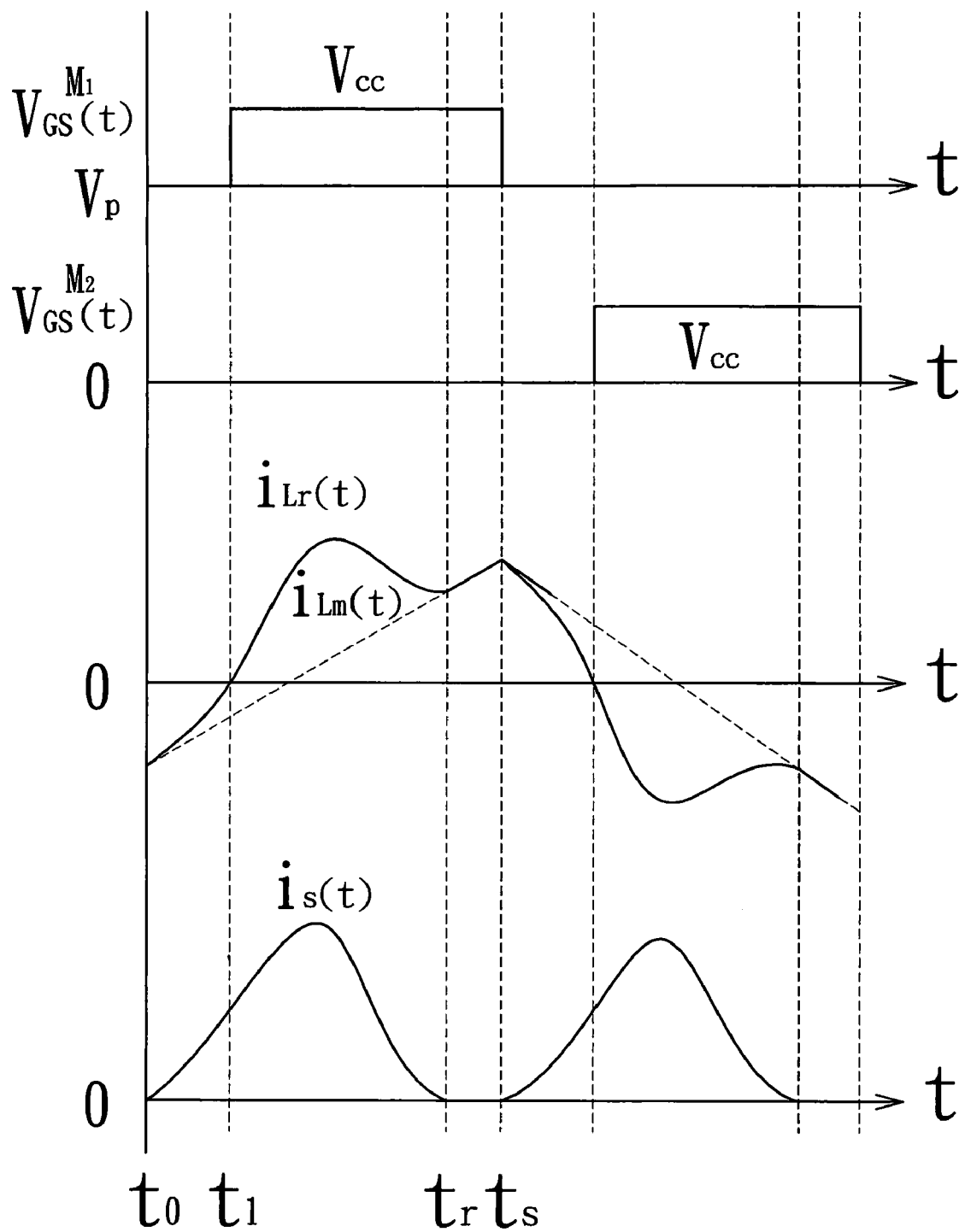
FIGS. 2a, 2b and 2c show voltage and current waveforms for the conditions of $f_s<f_r$, $f_s=f_r$ and $f_s>f_r$ respectively.
Figure 2B:
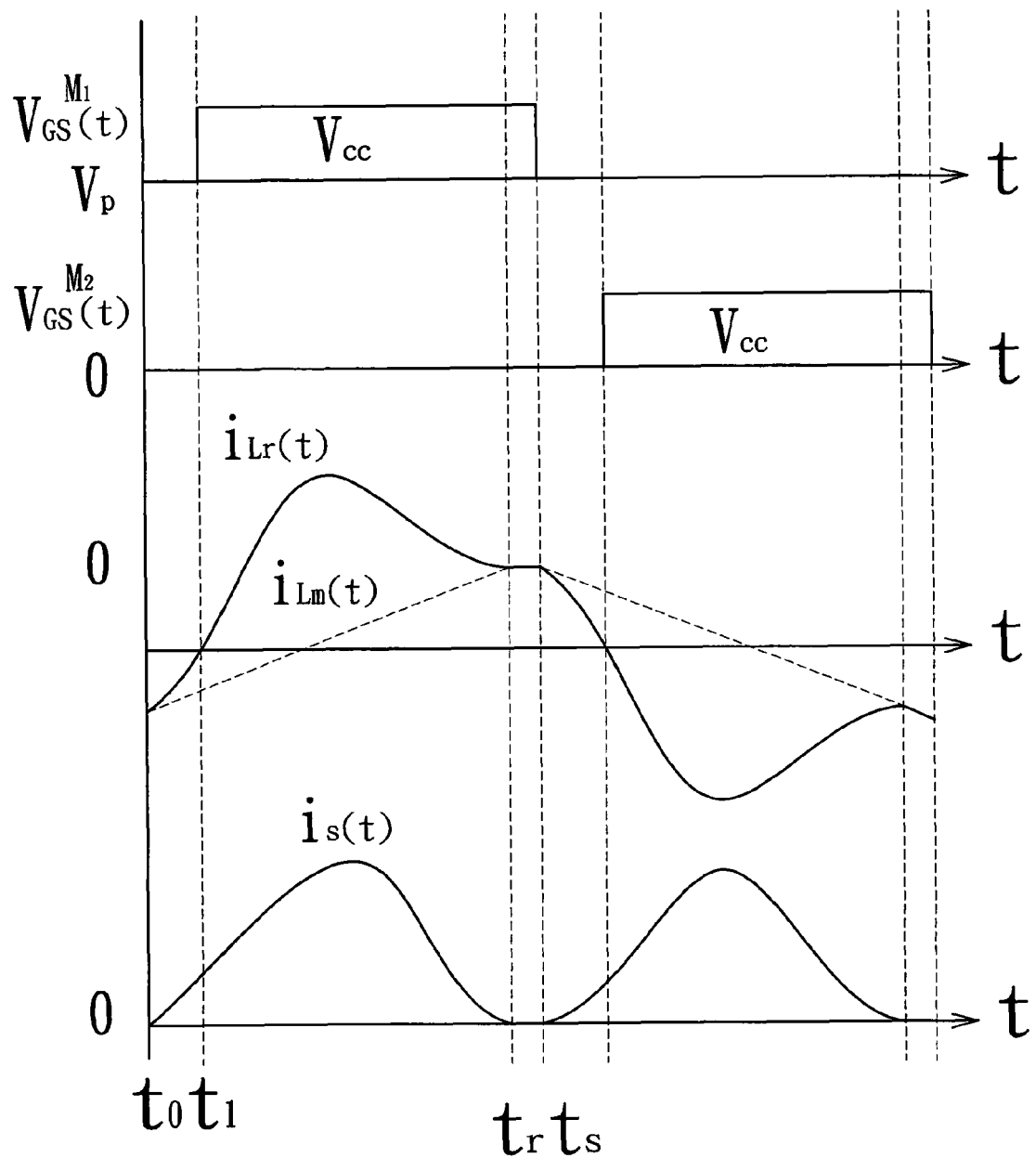
Figure 2C:
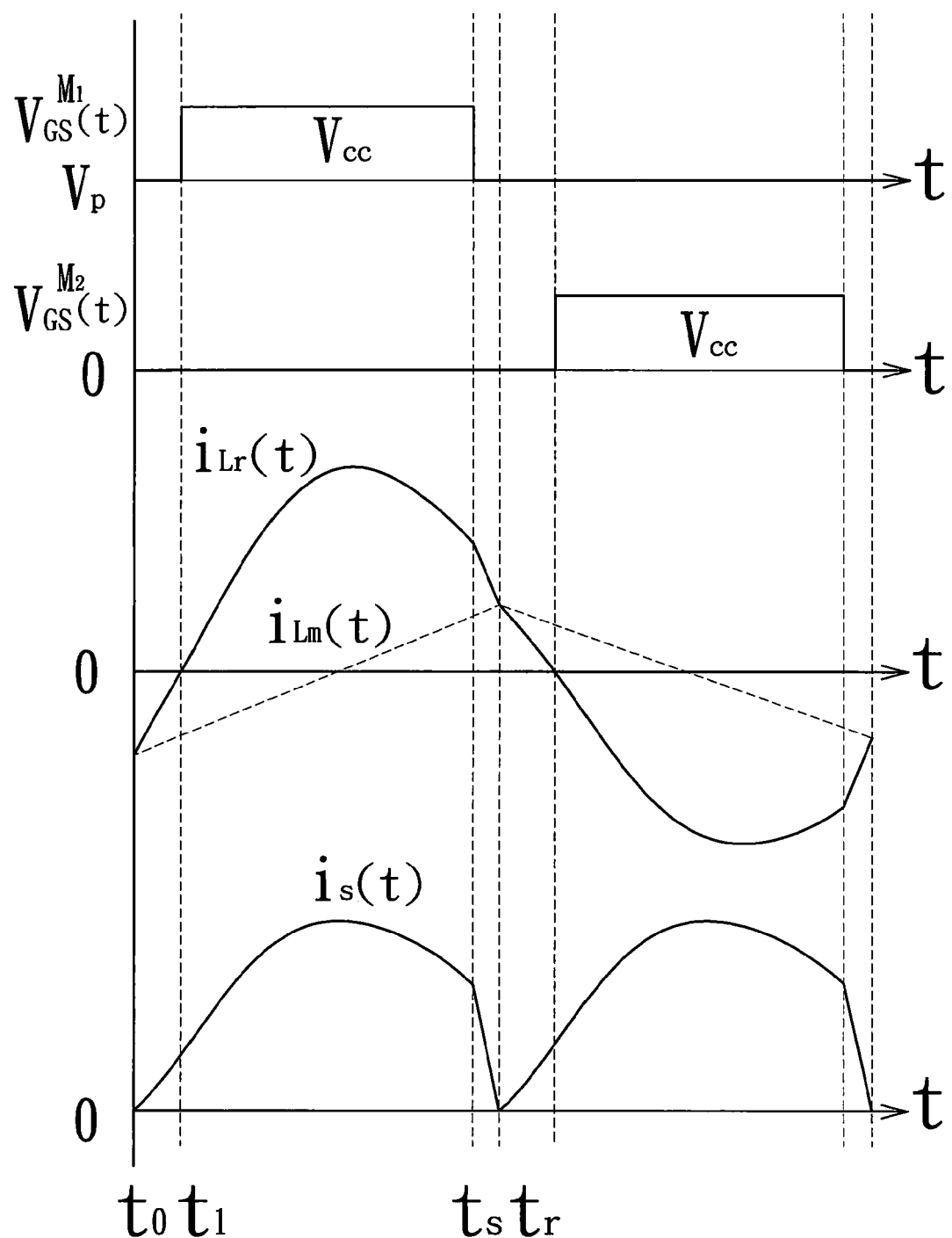

Firstly, the effect of the relationship between the switching frequency and the resonant frequency on the converter operation is illustrated with the analyses of FIG. 2a through 2c. Six exemplary circuit topologies according to the present invention are shown in FIG. 3a, FIG. 4a, FIG. 4b, FIG. 5a, FIG. 6a and FIG. 6b.

Under the condition of $f_s<f_r$, during the interval of $t_r \leq t \leq t_s$, the first switch transistor $M_1$ is turned on and the second switch transistor $M_2$ is turned off, so the first synchronous rectifier $SR_1$ is turned on and the second synchronous rectifier $SR_2$ is turned off. A reverse voltage resulting from the voltage difference between the output voltage $V_o$ and the secondary voltage $v_s(t)$ is imposed on $SR_1$. The reverse voltage imposed on the conducting $SR_1$ will cause a huge shoot-through current $$i_{st}(t) = \frac{V_o - v_s(t)}{R_{on}}$$

to burn down $SR_1$, where $R_{on}$ is the very small on-resistance of $M_1$.

Under the condition of $f_s>f_r$, during the interval of $t_s \leq t \leq t_r$, both $M_1$ and $M_2$ are turned off, so $SR_1$ and $SR_2$ are turned off. Even if the channel of $SR_1$ is cut off, $i_s(t)>0$ still can flow through the body diode of $SR_1$, the converter still can operate safely. Therefore, all the embodiments according to the present invention are merely applicable to the condition of $f_s>f_r$.

The voltage waveforms shown in FIG. 3b, FIG. 4c, FIG. 5b and FIG. 6c correspond to the six embodiments shown in FIGS. 3a, 4a, 4b, 5a, 6a and 6b. It is emphatically noted that $M_1$, $M_2$, $SR_1$ and $SR_2$ according to the present invention can be implemented with a p-channel metal oxide semiconductor field effect transistor (PMOS), an n-channel metal oxide semiconductor field effect transistor (NMOS), a p-type junction field effect transistor (p-JFET) or an n-type junction field effect transistor (n-JFET). For the convenience of illustration, it is assumed in this text that $M_1$, $M_2$, $SR_1$ and $SR_2$ are all implemented with NMOS.

Figure 3A:
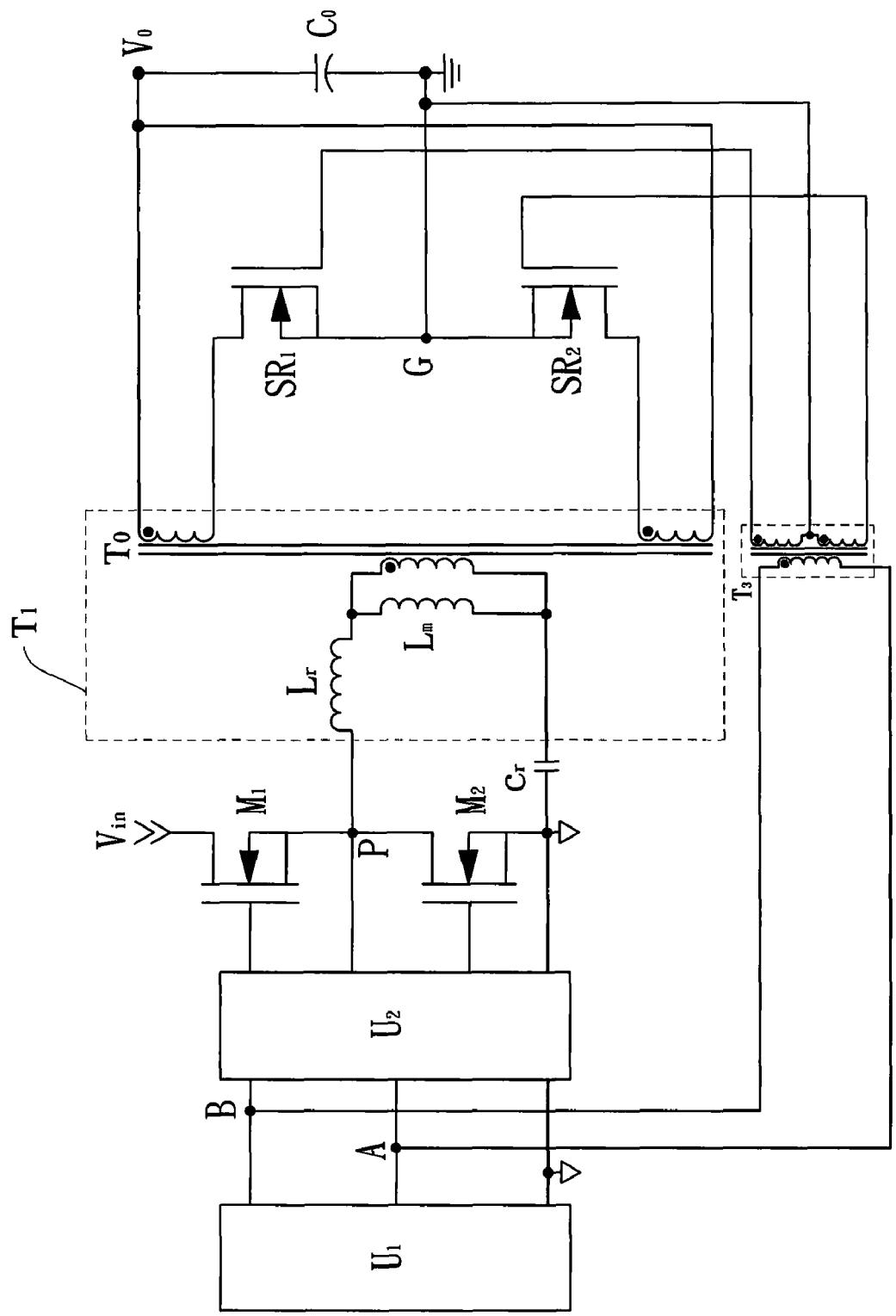
FIGS. 3a and 3b show a circuit diagram and drive voltage waveforms of the first embodiment according to the present invention.
Figure 3B:
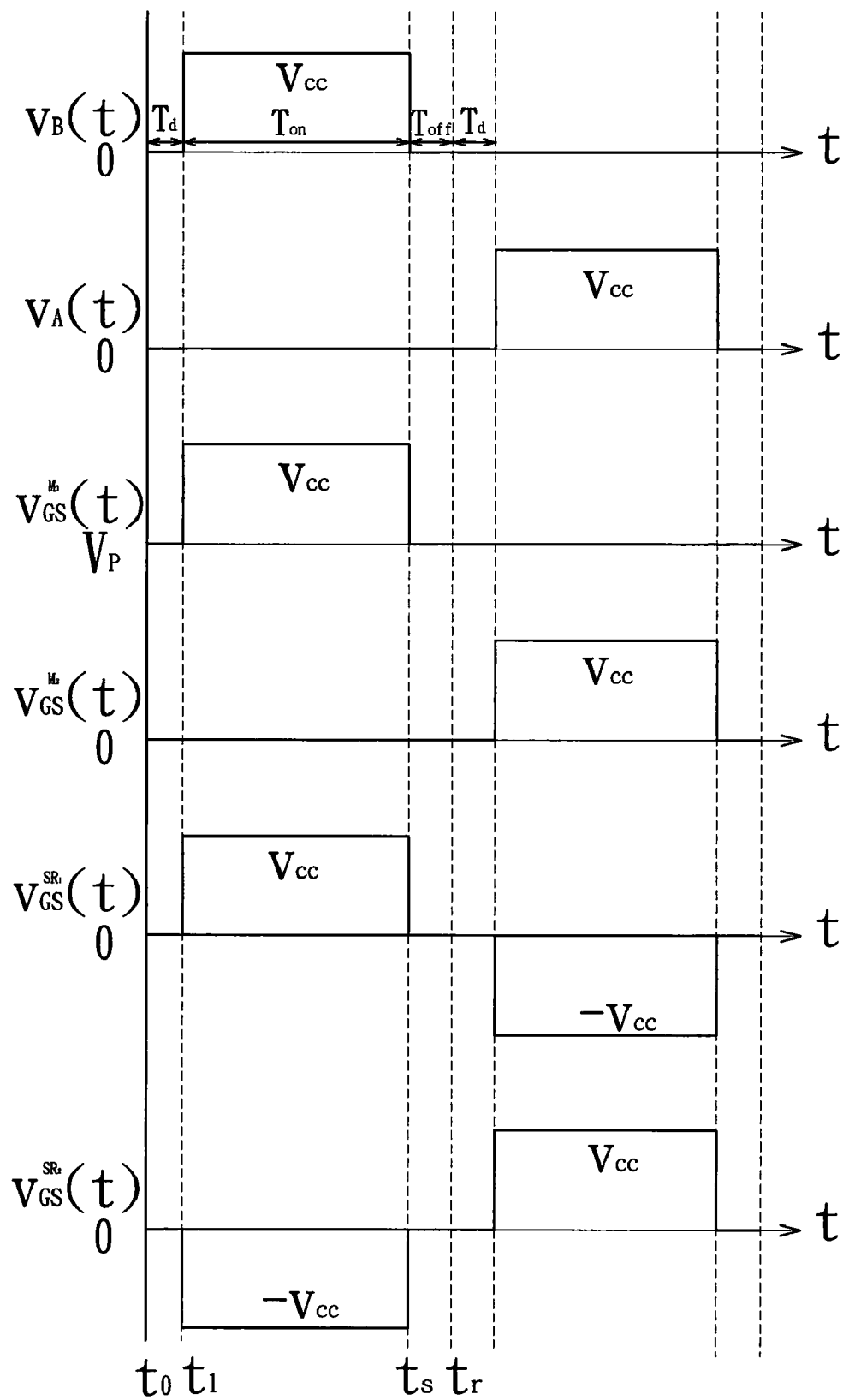
Figure 4A:
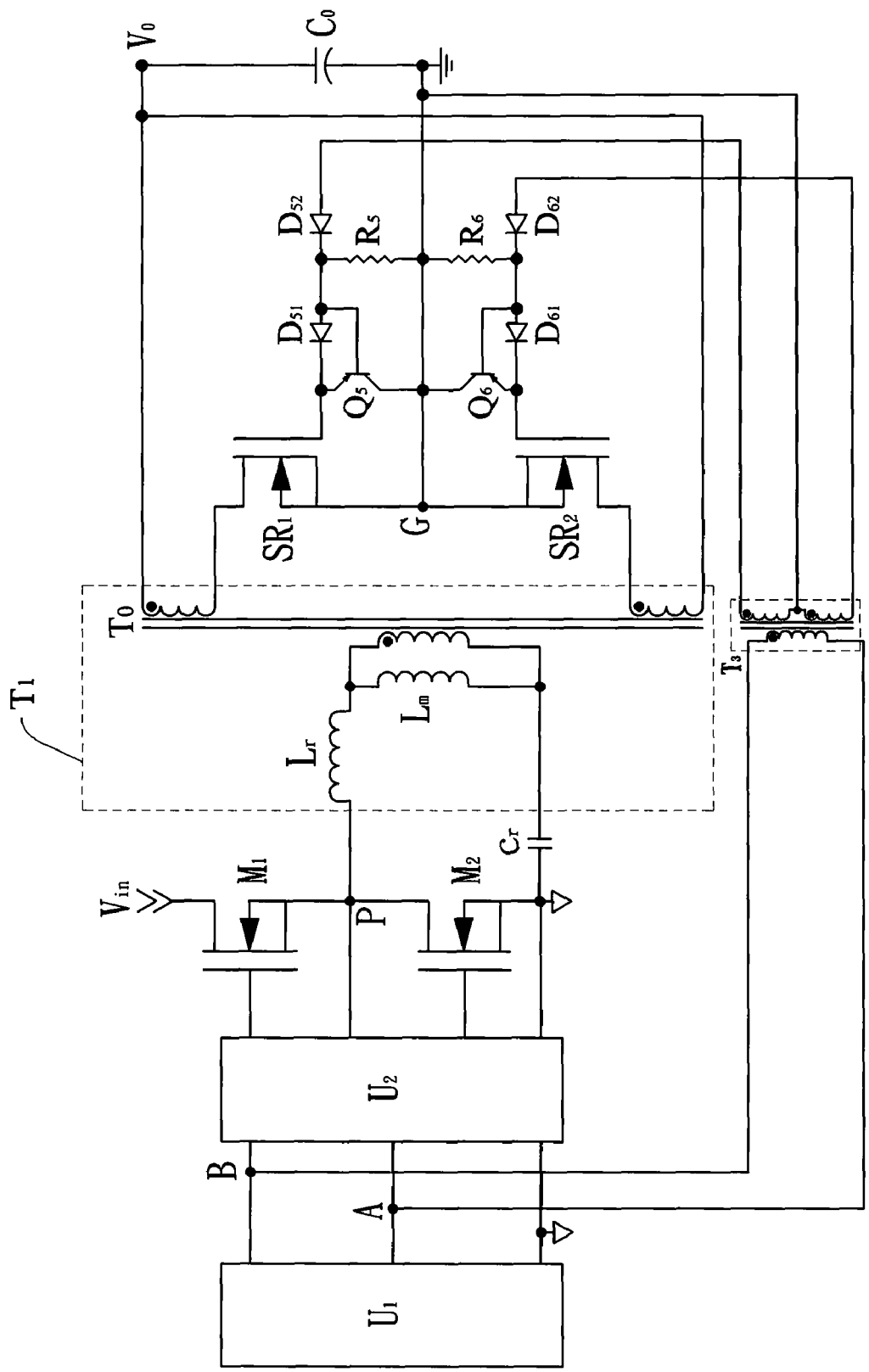
FIGS. 4a and 4c show a circuit diagram and drive voltage waveforms of the second embodiment according to the present invention.
Figure 4B:
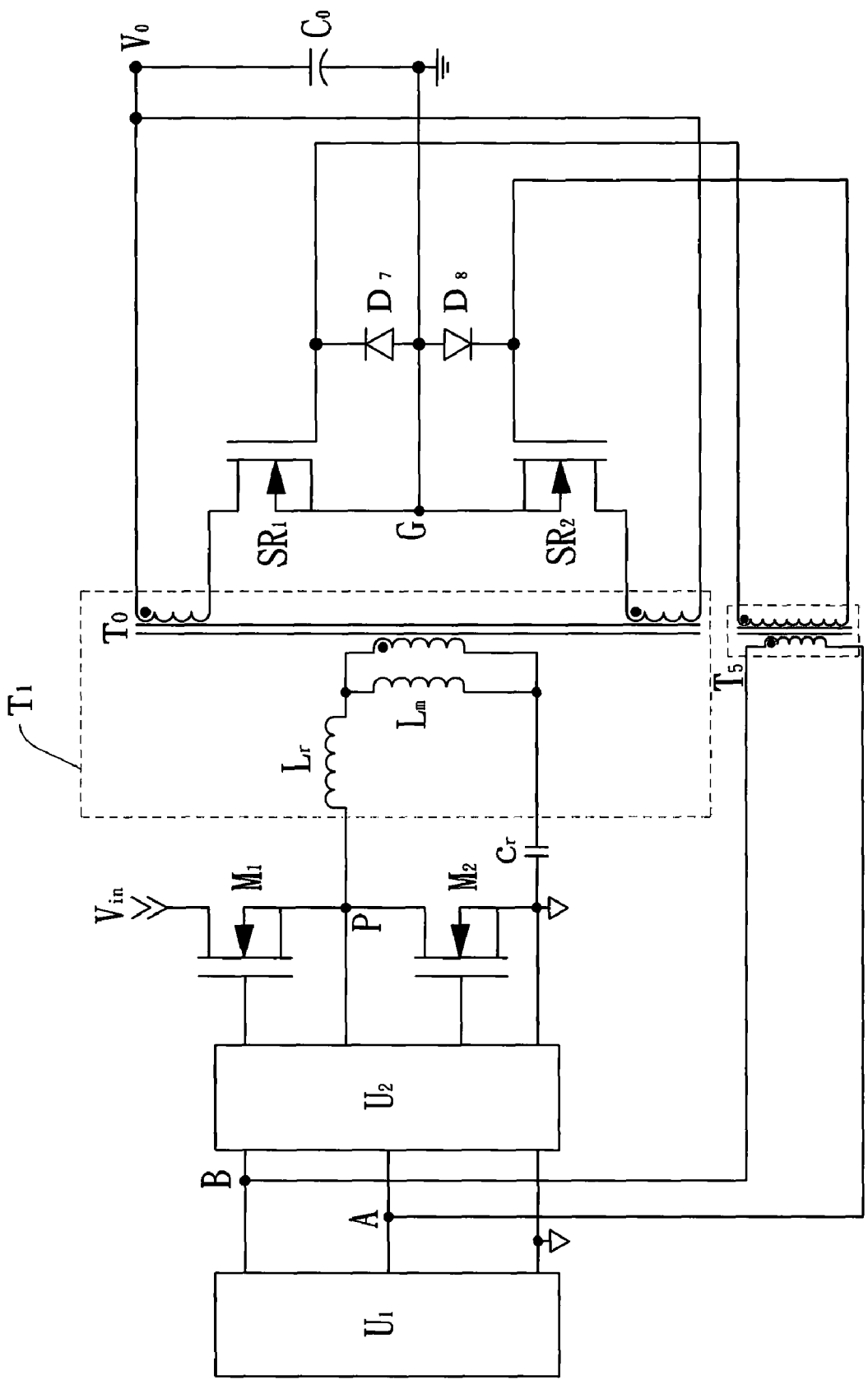

Three exemplary embodiments are shown in FIG. 3a, FIG. 4a and FIG. 4b when the primary IC controller $U_1$ outputs two ground-referenced drive voltages $v_B(t)$ and $v_A(t)$. The circuit diagram and drive voltage waveforms of the first embodiment according to the present invention are shown in FIGS. 3a and 3b, respectively. The ideal transformer $T_0$ comprises a primary winding $N_p$ and two secondary windings $N_s$. A primary circuit is connected to the $N_p$ and a secondary circuit to the two $N_s$.

The primary circuit includes a first switch transistor $M_1$, a second switch transistor $M_2$ and an LLC resonant tank, which includes a magnetizing inductor $L_m$, a resonant inductor $L_r$ and a resonant capacitor $C_r$. $M_1$ and $M_2$ are connected between an input voltage source $V_{in}$ and a primary ground terminal in a half-bridge configuration, where the point at which $M_1$, $M_2$ and LLC resonant tank intersect is called a first node P with a voltage $V_P$, and the LLC resonant tank is connected between the first node P and the primary ground terminal.

It is emphatically noted that a practical transformer $T_1$ is equivalent to the integration of the ideal transformer $T_0$ including the $N_p$ and the two $N_s$, $L_m$ and a leakage inductor, where $L_m$ is in parallel with the $N_p$, and the leakage inductor is in series with the parallel circuit of $L_m$ and $N_p$. $L_m$ can be measured from the primary side with the two $N_s$ open-circuited, and the leakage inductance can be measured from the primary side with the two $N_s$ short-circuited. If the $N_p$ and the two $N_s$ of $T_1$ are wound with a sandwich structure, then an external $L_r$ is necessary, but if the $N_p$ and the two $N_s$ of $T_1$ are wound on a slotted bobbin, then the $L_r$ can be provided by the leakage inductance of $T_1$. A transformer with a slotted bobbin is used in this example hereafter but it can be replaced by an ordinary transformer having a sandwich winding structure in series with an external $L_r$.

When $M_1$ is turned on but $M_2$ is turned off, $V_P$ is equal to $V_{in}$, but when $M_1$ is turned off but $M_2$ is turned on, $V_P$ is equal to 0. This means that the potential $V_P$ is fluctuating. The output voltages $v_B(t)$ and $v_A(t)$ of $U_1$ are referred to the primary ground, so they cannot be directly used as the gate-source voltages $v_{GS}^{M_1}(t)$ and $v_{GS}^{M_2}(t)$ for $M_1$ and $M_2$, especially for $M_1$. In this case, an IC-based or a transformer-based driver module $U_2$ is needed to convert $v_B(t)$ and $v_A(t)$ referred to the primary ground into $v_{GS}^{M_1}(t)$ and $v_{GS}^{M_2}(t)$ referred to the sources to $M_1$ and $M_2$.

The secondary circuit includes a first synchronous rectifier $SR_1$, a second synchronous rectifier $SR_2$ and an output capacitor $C_o$. $SR_1$ and $SR_2$ are connected in a center-tapped common-source rectifier configuration between the two $N_s$ and the secondary ground terminal, where the two $N_s$ are connected at the output voltage terminal and the common source of $SR_1$ and $SR_2$ is connected at the secondary ground terminal G.

$SR_1$ and $SR_2$ are driven by a differential transformer $T_3$, which has a primary winding and two secondary windings as well as a 1:1:1 primary-to-secondary turns ratio, so a primary bipolar differential voltage $v_{T_3}(t)=v_B(t)-v_A(t)$ of $T_3$ generates two secondary bipolar gate-source voltages $v_{GS}^{SR_1}(t)$ and $v_{GS}^{SR_2}(t)$ of $SR_1$ and $SR_2$. $v_{T_3}(t)$, $v_{GS}^{SR_1}(t)$ and $v_{GS}^{SR_2}(t)$ are listed in Table 1:

TABLE 1

| $V_{T_3}(t)$ | $V_{GS}^{SR_1}(t)$ | $V_{GS}^{SR_2}(t)$ |
|---|---|---|
| $V_{cc}$ | $V_{cc}$ | $-V_{cc}$ |
| 0 | 0 | 0 |
| $-V_{cc}$ | $-V_{cc}$ | $V_{cc}$ |

The corresponding voltage waveforms of $v_A(t)$, $v_B(t)$, $v_{GS}^{M_1}(t)$, $v_{GS}^{M_2}(t)$, $v_{GS}^{SR_1}(t)$ and $v_{GS}^{SR_2}(t)$ are shown in FIG. 3b.

A circuit diagram of the second embodiment according to the present invention is shown in FIG. 4a, where two half-wave rectifiers and two fast turn-off circuits are connected between the secondary windings of $T_3$ and the gates of $SR_1$ and $SR_2$, respectively. One of the two half-wave rectifiers comprises a diode $D_{52}$ and a resistor $R_5$ for $SR_1$, and the other a diode $D_{62}$ and a resistor $R_6$ for $SR_2$. One of the two fast turn-off circuits comprises a diode $D_{51}$ and a PNP bipolar transistor $Q_5$ for $SR_1$, and the other a diode $D_{61}$ and a PNP bipolar transistor $Q_6$ for $SR_2$.

$v_{GS}^{SR_1}(t)$ and $v_{GS}^{SR_2}(t)$ are provided by two voltages, which are first induced by the two secondary windings of $T_3$ and then processed by the half-wave rectifiers as well as the fast turn-off circuits. When $V_{T_3}(t)=V_{cc}$, $D_{52}$, $D_{51}$ and $Q_6$ are turned on but $Q_5$, $D_{62}$ and $D_{61}$, are turned off, so $SR_1$ is turned on but $SR_2$ is turned off. When $V_{T_3}(t)=0$, $D_{52}$, $D_{51}$, $D_{62}$ and $D_{61}$ are turned off but $Q_5$ and $Q_6$ are turned on, so both $SR_1$ and $SR_2$ are turned off. When $V_{T_3}(t)=-V_{cc}$, $D_{62}$, $D_{61}$ and $Q_5$ are turned on but $Q_6$, $D_{52}$ and $D_5$, are turned off, so $SR_2$ is turned on but $SR_1$ is turned off. $V_{T_3}(t)$, $v_{GS}^{SR_1}(t)$ and $v_{GS}^{SR_2}(t)$ are listed in Table 2:

TABLE 2

| $V_{T_3}(t)$ | $V_{GS}^{SR_1}(t)$ | $V_{GS}^{SR_2}(t)$ |
|---|---|---|
| $V_{cc}$ | $V_{cc}$ | 0 |
| 0 | 0 | 0 |
| $-V_{cc}$ | 0 | $V_{cc}$ |

A circuit diagram of the third embodiment according to the present invention is shown in FIG. 4b. $v_{GS}^{SR_1}(t)$ and $v_{GS}^{SR_2}(t)$ are provided by a differential transformer $T_5$ and a signal distributor, which comprises a diode $D_7$ and a diode $D_8$. $T_5$ has a primary winding and a secondary winding as well as a 1:1 primary-to-secondary turns ratio, so a primary bipolar differential voltage $v_{T_5}(t)=v_B(t)-v_A(t)$ or $T_5$ generates an identical secondary bipolar differential voltage. $D_7$ and $D_8$ are connected in a common-anode configuration between the secondary winding of $T_5$ and the gates of $SR_1$ and $SR_2$. The signal distributor is used for converting the secondary bipolar differential voltage into two unipolar drive voltages as well as distributing these two voltages to $SR_1$ and $SR_2$ respectively.

Figure 4C:
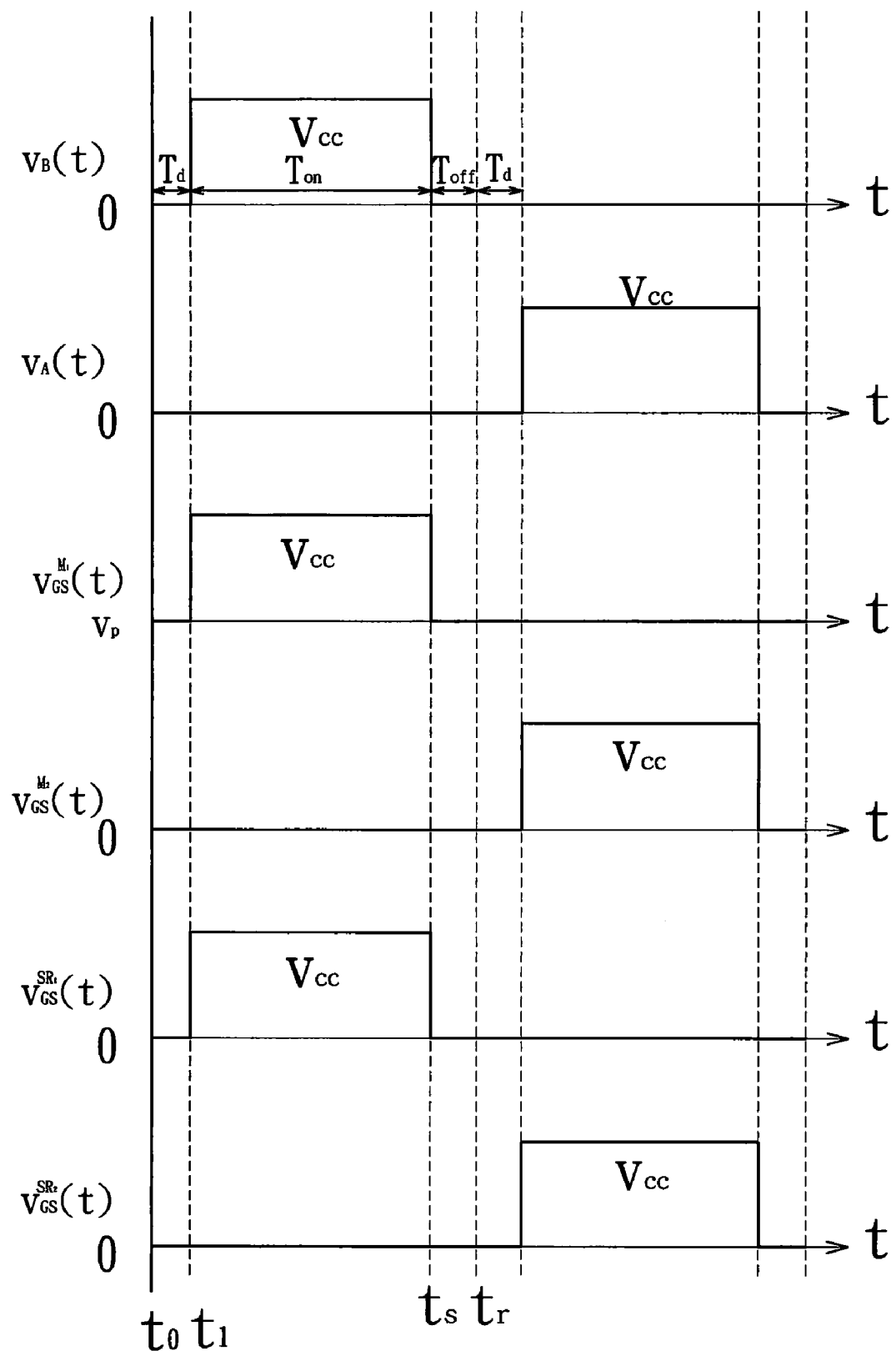

When $v_{T_5}(t)=V_{cc}$, $D_8$ is turned on but $D_7$ is turned off, so $SR_1$ is turned on but $SR_2$ is turned off. When $V_{T_5}(t)=0$, both $D_7$ and $D_8$ are turned off, so both $SR_1$ and $SR_2$ are turned off. When $V_{T_5}(t)=-V_{cc}$, $D_7$ is turned on but $D_8$ is turned off, so $SR_2$ is turned on but $SR_1$ is turned off. $v_{T_5}(t)$, $v_{GS}^{SR_1}(t)$ and $v_{GS}^{SR_2}(t)$ are listed in Table 3, and the corresponding voltage waveforms of $v_A(t)$, $v_B(t)$, $v_{GS}^{M_1}(t)$, $v_{GS}^{M_2}(t)$, $v_{GS}^{SR_1}(t)$ and $v_{GS}^{SR_2}(t)$ of the second and the third embodiments are shown in FIG. 4c.

TABLE 3

| $V_{T_5}(t)$ | $V_{GS}^{SR_1}(t)$ | $V_{GS}^{SR_2}(t)$ |
|---|---|---|
| $V_{cc}$ | $V_{cc}$ | 0 |
| 0 | 0 | 0 |
| $-V_{cc}$ | 0 | $V_{cc}$ |

Figure 5A:
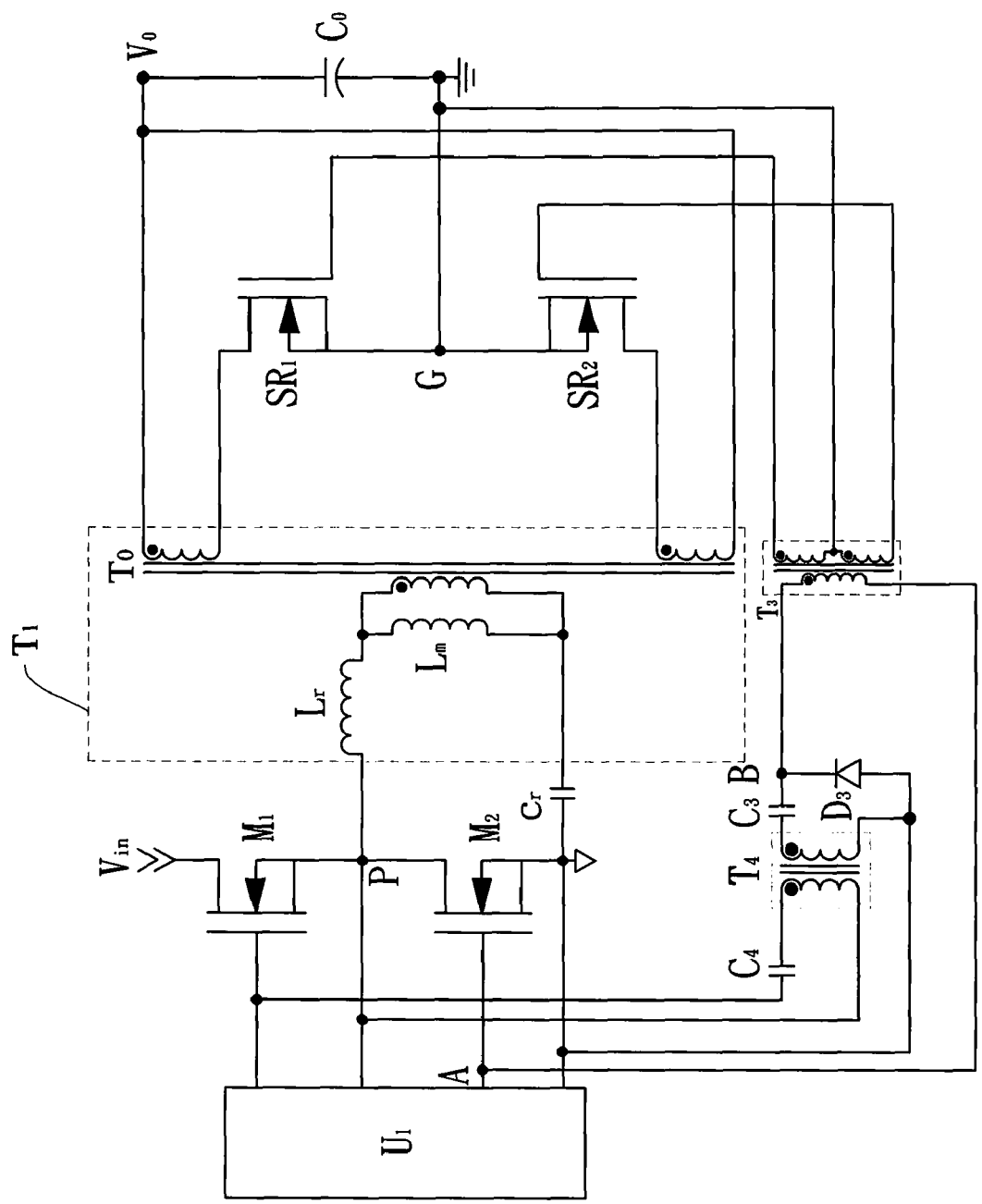
FIGS. 5a and 5b show a circuit diagram and drive voltage waveforms of the fourth embodiment according to the present invention.
Figure 6A:
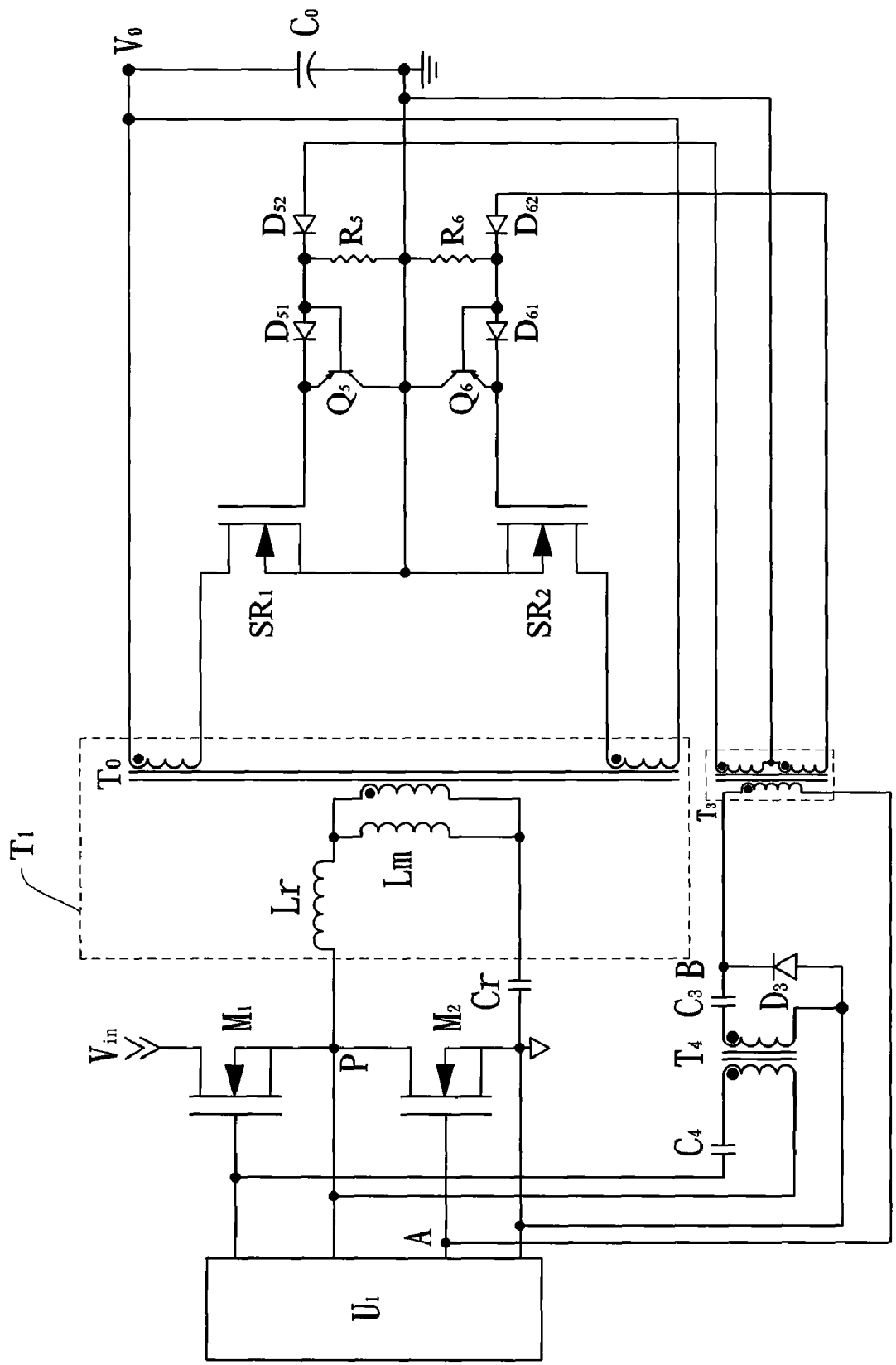
FIGS. 6a and 6c show a circuit diagram and drive voltage waveforms of the fifth embodiment according to the present invention.
Figure 6B:
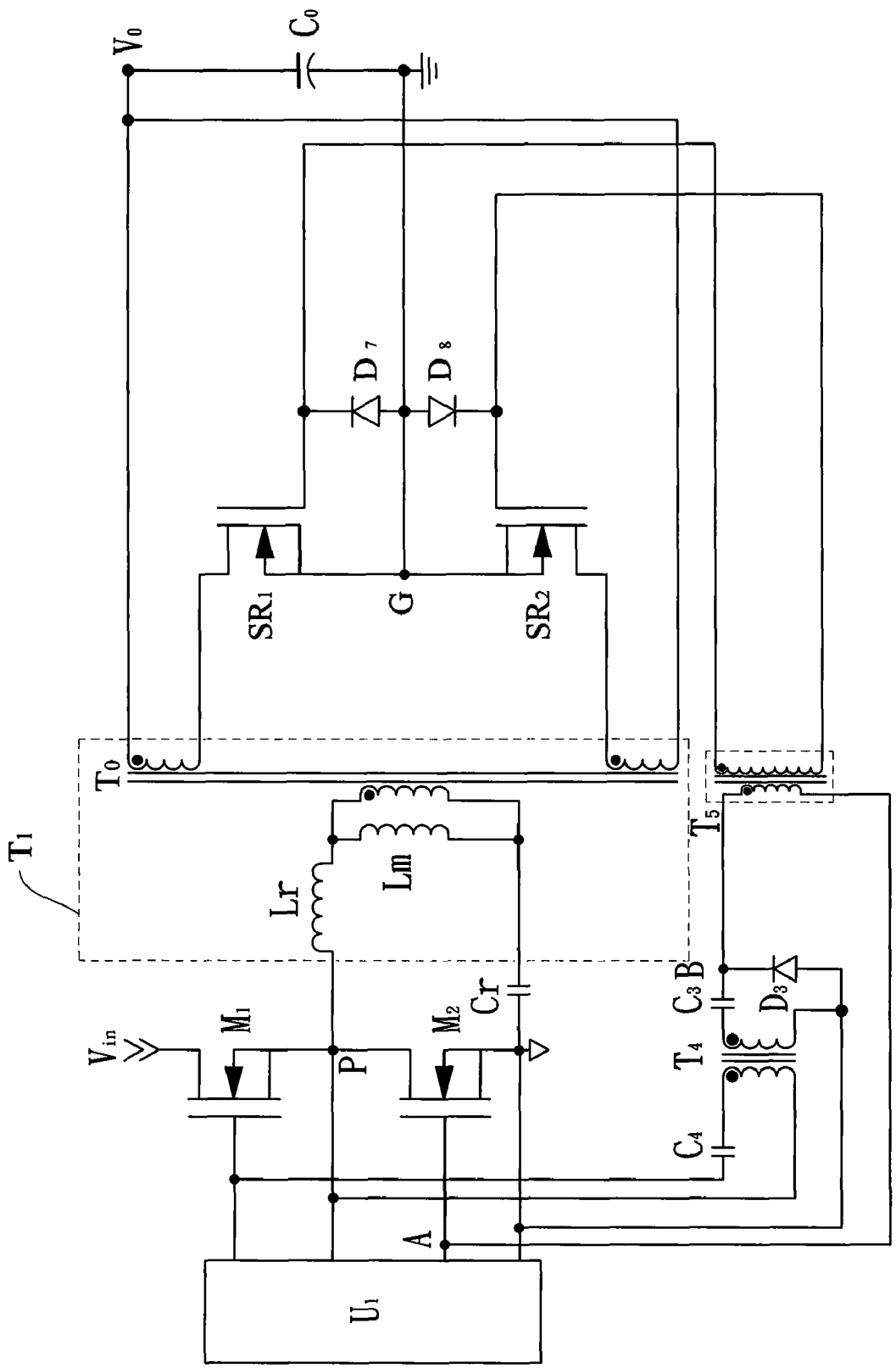
Figure 6C:
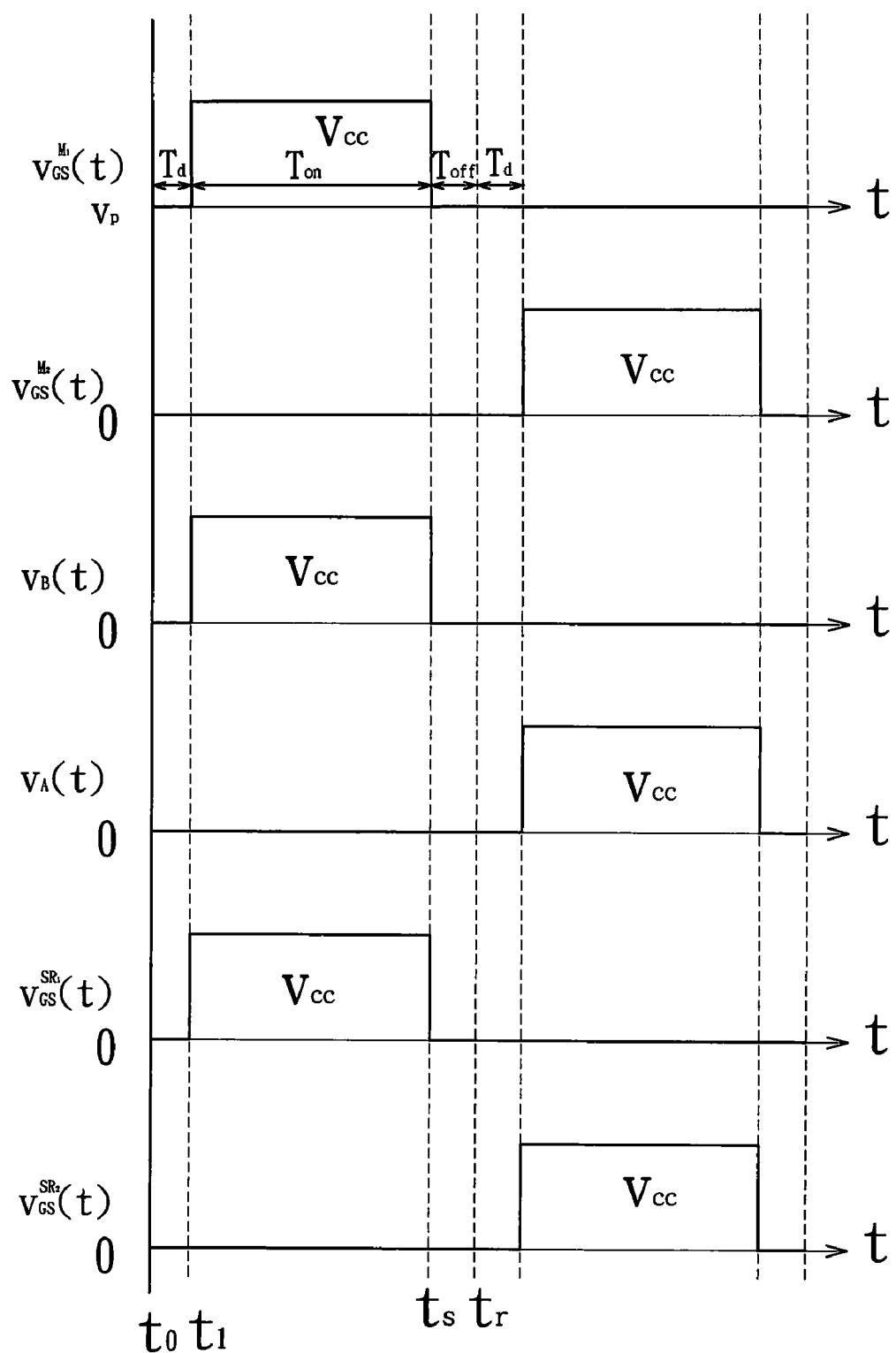

Three exemplary embodiments are shown in FIG. 5a, FIG. 6a and FIG. 6b, when the primary IC controller $U_1$ outputs two drive voltages referred to the sources of $M_1$ and $M_2$ for directly driving $M_1$ and $M_2$. However, the output drive voltage of $U_1$ for $M_1$ is referred to the source of $M_1$ but not the primary ground instead, so it cannot be directly used as $v_B(t)$ on $T_3$, but the output drive voltage of $U_1$ for $M_2$ is referred to the primary ground, so it can be used as $v_A(t)$ on $T_3$. In view of this, the combined circuit of a DC shifter and a DC restorer is used to convert the output drive voltage of $U_1$ for $M_1$ referred to the source of $M_1$ into $v_B(t)$ referred to the primary ground. The DC shifter comprises a capacitor $C_4$ and a pulse transformer $T_4$ that has a primary winding and a secondary winding as well as a 1:1 primary-to-secondary turns ratio. The DC restorer comprises a capacitor $C_3$ and a diode $D_3$. $T_3$ is connected between the DC restorer and the gates of $SR_1$ and $SR_2$ to convert a primary bipolar voltage $v_{T_3}(t)=v_B(t)-v_A(t)$ into two secondary bipolar voltages $v_{GS}^{SR_1}(t)$ and $v_{GS}^{SR_2}(t)$.

The DC shifter converts the output drive voltage of $U_1$ for $M_1$ to an AC voltage, and then the DC restorer converts the AC voltage back to a DC voltage referred to the primary ground. The voltage across $C_4$ can be derived from the volt-seconds product equilibrium equation:

$$(V_{cc}-V_{C4})D=V_{C4}(1-D) \Rightarrow V_{C4}=DV_{cc}$$

where D is the duty ratio of $M_1$ and $D \approx 0.5$ $\Rightarrow V_{C4}=DV_{cc} \approx 0.5V_{cc}$, so $V_{C4}$ can be viewed as a constant voltage source during a switching period. The voltage across the secondary winding of $T_4$ can be expressed as:

$$v_w(t) = \begin{cases} V_{cc} - V_{C_4}, & M_1 \text{ on and } D_3 \text{ off} \\ -V_{C_4}, & M_1 \text{ off and } D_3 \text{ on} \end{cases}$$

When $D_3$ is turned on, $C_3$ is recharged to $V_{C_4}$. Therefore, the voltage across $C_3$, $V_{C_3}=V_{C_4} \approx 0.5V_{cc}$, can be also viewed as a constant voltage source during a switching period.

The voltage difference between the node B and the primary ground terminal can be expressed as:

$$v_B(t) = V_{C_3} + v_w(t)$$
$$= V_{C_4} + \begin{cases} V_{cc} - V_{C_4}, & M_1 \text{ on and } D_3 \text{ off} \\ -V_{C_4}, & M_1 \text{ off and } D_3 \text{ on} \end{cases}$$
$$= \begin{cases} V_{cc}, & M_1 \text{ on and } D_3 \text{ off} \\ 0, & M_1 \text{ off and } D_3 \text{ on} \end{cases}$$

The voltage of the node B is denoted as $v_B(t)$ referred to the primary ground, so the differential voltage $v_{T_3}(t)=v_B(t)-v_A(t)$ can be imposed on $T_3$ to generate $v_{GS}^{SR_1}(t)$ and $v_{GS}^{SR_2}(t)$.

Figure 5B:
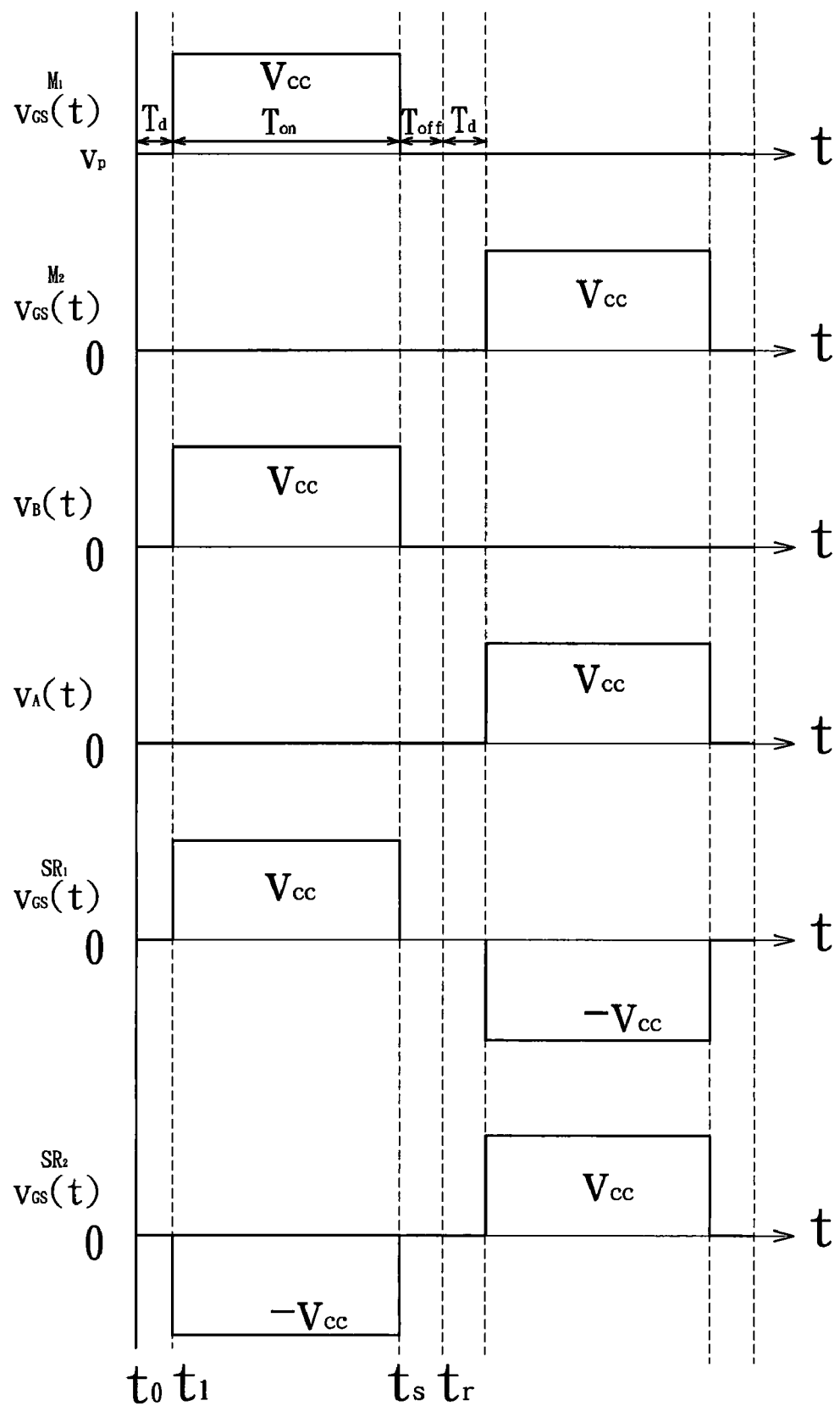

The secondary circuit of the fourth embodiment shown in FIG. 5a is the same as that of the first embodiment shown in FIG. 3a, so they have similar voltage waveforms shown in FIGS. 3b and 5b. The fifth and sixth embodiments shown in FIG. 6a and FIG. 6b respectively have the same primary circuit as the fourth embodiment shown in FIG. 5a as well as the same secondary circuit as the second and third embodiments shown in FIG. 4a and FIG. 4b, so they have similar voltage waveforms shown in FIGS. 4c and 6c. The operational principles of the fifth and the sixth embodiments can be inferred from the aforementioned embodiments, and will not be restated here.

While the invention has been described in terms of what are presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A half-bridge LLC resonant converter with self-driven secondary synchronous rectifiers, comprising:

a first primary switch transistor and a second primary switch transistor connected between an external voltage source and a primary ground terminal in a half-bridge configuration, wherein a drain terminal of said first primary switch transistor is connected to said external voltage source, a source terminal of said first primary switch transistor and a drain terminal of said second primary switch transistor are commonly connected to a node P, and a source terminal of said second primary switch transistor is connected to said primary ground terminal;

an LLC resonant tank connected between said node P and said primary ground terminal, wherein said LLC resonant tank comprises a resonant capacitor, a resonant inductor, and a magnetizing inductor connected in series, and said magnetizing inductor is provided by a primary winding of a power transformer;

a secondary power loop connected between a first secondary winding and a second secondary winding of said power transformer, wherein said secondary power loop comprises a first secondary synchronous rectifier transistor, a second secondary synchronous rectifier transistor and a filter capacitor, said first secondary synchronous rectifier transistor and said second secondary synchronous rectifier transistor are connected in a center-tapped common source rectifier configuration between said first and said second secondary windings of said power transformer a source terminal of said first secondary synchronous rectifier transistor and a source terminal of said second secondary synchronous rectifier transistor are commonly connected to a secondary ground terminal, the other two terminals of said first secondary winding and said second secondary winding are connected to an output voltage terminal, and said filter capacitor is connected between said output voltage terminal and said secondary ground terminal;

a primary IC controller providing two primary driving pulses to respectively drive said first primary switch transistor and said second primary switch transistor; and a gate driver connected between said primary IC controller and gates of said first secondary synchronous rectifier transistor and said second secondary synchronous rectifier transistor for converting said two primary driving pulses of said first primary switch transistor and said second primary switch transistor into two secondary driving pulses of said first secondary synchronous rectifier transistor and said second secondary synchronous rectifier transistor, wherein said gate driver comprises:

a differential transformer;

a DC shifter comprising a shifter capacitor and a pulse transformer, wherein said pulse transformer comprises a primary winding and a secondary winding, said shifter capacitor and said primary winding of said pulse transformer are serially connected between gate of said first primary switch transistor and said node P to convert said primary driving pulse of said first primary switch transistor to an AC pulse on said primary winding of said pulse transformer; and a DC restorer comprising a restorer capacitor and a restorer diode, wherein an anode of said restorer diode is connected to one terminal of said secondary winding of said pulse transformer and said primary ground terminal, and said restorer capacitor is connected between a cathode of said restorer diode and the other terminal of said secondary winding of said pulse transformer to convert said AC pulse to a DC pulse referring to said primary ground terminal.

2. The half-bridge LLC resonant converter with self-driven secondary synchronous rectifiers according to claim 1, wherein said differential transformer comprises a primary winding and two secondary windings, two terminals of said primary winding of said differential transformer are connected to said cathode of said restorer diode and a gate of said second primary switch transistor, said two secondary windings are constructed in a center-tapped configuration at said secondary ground terminal and connected to gates of said first secondary synchronous rectifier and said second secondary synchronous rectifier, for providing two secondary driving pulses to respectively drive said first secondary synchronous rectifier transistor and said second secondary synchronous rectifier transistor.

3. The half-bridge LLC resonant converter with self-driven secondary synchronous rectifiers according to claim 2, further comprising two combination circuits respectively connected between said two secondary windings of said differential transformer and gates of said first secondary synchronous rectifier transistor and said second secondary synchronous rectifier transistor, and each of said two combination circuits comprises a half-wave rectifier and a fast turn-off circuit, said two half-wave rectifiers rectify two secondary bipolar pulses to two secondary unipolar pulses for driving said first secondary synchronous rectifier transistor and said second secondary synchronous rectifier transistor, and said two fast turn-off circuits quickly turns off said first secondary synchronous rectifier transistor and said second secondary synchronous rectifier transistor.

4. The half-bridge LLC resonant converter with self-driven secondary synchronous rectifiers according to claim 3, wherein each of said half-wave rectifiers comprises a diode and a resistor and said fast turn-off circuit comprises a diode and a PNP bipolar transistor.

5. The half-bridge LLC resonant converter with self-driven secondary synchronous rectifiers according to claim 1, wherein said gate driver further comprises a a signal distributor, said differential transformer comprises a primary winding and a secondary winding, two terminals of said primary winding of said differential transformer are connected to said cathode of said restorer diode and a gate of said second primary switch transistor, two terminals of said secondary winding of said differential transformer are respectively connected to gates of said first secondary synchronous rectifier transistor and said second secondary synchronous rectifier transistor, said signal distributor comprises two diodes with a common-anode configuration at the secondary ground terminal and two cathodes of said two diodes of said signal distributor are respectively connected to gates of said first secondary synchronous rectifier transistor and said second secondary synchronous rectifier transistor.

* * * * *